US011044190B2

(12) United States Patent
Ramaswamy et al.

(10) Patent No.: US 11,044,190 B2
(45) Date of Patent: Jun. 22, 2021

(54) MANAGING FORWARDING ELEMENTS AT EDGE NODES CONNECTED TO A VIRTUAL NETWORK

(71) Applicant: VMWARE, INC., Palo Alto, CA (US)

(72) Inventors: Navaneeth Krishnan Ramaswamy, Chennai (IN); Gopa Kumar, Palo Alto, CA (US); Stephen Craig Connors, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/721,965

(22) Filed: Dec. 20, 2019

(65) Prior Publication Data

US 2021/0126853 A1    Apr. 29, 2021

(30) Foreign Application Priority Data

Oct. 28, 2019  (IN) .............................. 201941043654

(51) Int. Cl.
*H04L 12/755* (2013.01)
*H04L 12/751* (2013.01)
(Continued)

(52) U.S. Cl.
CPC ........ *H04L 45/021* (2013.01); *H04L 12/4641* (2013.01); *H04L 41/0873* (2013.01);
(Continued)

(58) Field of Classification Search
CPC ... H04L 45/021; H04L 41/12; H04L 41/0873; H04L 12/4633; H04L 12/4641; H04L 45/745; H04L 49/354; H04L 49/70
See application file for complete search history.

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| EP | 1912381 A1 | 4/2008 |
| EP | 3041178 A1 | 7/2016 |

(Continued)

OTHER PUBLICATIONS

Non-Published Commonly Owned U.S. Appl. No. 16/945,700, filed Jul. 31, 2020, 37 pages, Nicira, Inc.

(Continued)

*Primary Examiner* — Kyung H Shin
(74) *Attorney, Agent, or Firm* — Adeli LLP

(57) ABSTRACT

Some embodiments provide a method for maintaining a virtual network that spans at least one cloud datacenter separate from multi-machine edge nodes of an entity. This method configures a gateway in the cloud datacenter to establish secure connections with several edge devices at several multi-machine edge nodes (e.g., branch offices, datacenters, etc.) in order to establish the virtual network. The method configures the gateway to assess quality of connection links with different edge devices, and to terminate a secure connection with a particular edge device for a duration of time after the assessed quality of the connection link to the particular edge device is worse than a threshold value. In some embodiments, the gateway is configured to distribute routes to edge devices at the edge nodes, and to forgo distributing any route to the particular edge device along the connection link for the duration of time when the assessed quality of the connection link is worse than (e.g., less than) a threshold value. In different embodiments, the gateway assesses the quality of the connection link based on different factors or different combinations of factors.

(Continued)

Examples of such factors in some embodiments include the following attributes of a connection link: packet loss, latency, signal jitter, etc. Also, the routes that the gateway distributes in some embodiments include routes that the edge devices distribute to the gateway, as well as routes that the gateway learns on its own.

20 Claims, 13 Drawing Sheets

(51) Int. Cl.
*H04L 29/06* (2006.01)
*H04L 12/26* (2006.01)
*H04L 12/723* (2013.01)
*H04L 12/46* (2006.01)
*H04L 12/24* (2006.01)

(52) U.S. Cl.
CPC .......... *H04L 43/0823* (2013.01); *H04L 45/02* (2013.01); *H04L 45/502* (2013.01); *H04L 63/029* (2013.01)

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 | 2/2012 | Ray | |
| 8,141,156 B1 * | 3/2012 | Mao ............... H04L 45/021 726/23 | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,661,295 B1 | 2/2014 | Khanna et al. | |
| 8,724,456 B1 | 5/2014 | Hong et al. | |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,137,334 B2 | 9/2015 | Zhou | |
| 9,154,327 B1 | 10/2015 | Marino et al. | |
| 9,306,949 B1 | 4/2016 | Richard et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,602,389 B1 | 3/2017 | Maveli et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,906,401 B1 | 2/2018 | Rao | |
| 9,930,011 B1 | 3/2018 | Clemons, Jr. et al. | |
| 9,942,787 B1 | 4/2018 | Tillotson | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,187,289 B1 | 1/2019 | Chen et al. | |
| 10,229,017 B1 | 3/2019 | Zou et al. | |
| 10,237,123 B2 | 3/2019 | Dubey et al. | |
| 10,250,498 B1 | 4/2019 | Bales et al. | |
| 10,263,832 B1 | 4/2019 | Ghosh | |
| 10,320,664 B2 | 6/2019 | Nainar et al. | |
| 10,326,830 B1 | 6/2019 | Singh | |
| 10,348,767 B1 | 7/2019 | Lee et al. | |
| 10,425,382 B2 | 9/2019 | Mayya et al. | |
| 10,454,708 B2 | 10/2019 | Mibu | |
| 10,454,714 B2 | 10/2019 | Mayya et al. | |
| 10,498,652 B2 | 12/2019 | Mayya et al. | |
| 10,511,546 B2 | 12/2019 | Singarayan et al. | |
| 10,523,539 B2 | 12/2019 | Mayya et al. | |
| 10,554,538 B2 | 2/2020 | Spohn et al. | |
| 10,560,431 B1 | 2/2020 | Chen et al. | |
| 10,565,464 B2 | 2/2020 | Han et al. | |
| 10,574,528 B2 | 2/2020 | Mayya et al. | |
| 10,594,516 B2 | 3/2020 | Cidon et al. | |
| 10,608,844 B2 | 3/2020 | Cidon et al. | |
| 10,637,889 B2 | 4/2020 | Ermagan et al. | |
| 10,666,460 B2 | 5/2020 | Cidon et al. | |
| 10,686,625 B2 | 6/2020 | Cidon et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,805,114 B2 | 10/2020 | Cidon et al. | |
| 10,805,272 B2 | 10/2020 | Mayya et al. | |
| 10,826,775 B1 | 11/2020 | Moreno et al. | |
| 10,841,131 B2 | 11/2020 | Cidon et al. | |
| 2002/0198840 A1 | 12/2002 | Banka et al. | |
| 2003/0088697 A1 | 5/2003 | Matsuhira | |
| 2003/0112808 A1 | 6/2003 | Solomon | |
| 2003/0126468 A1 | 7/2003 | Markham | |
| 2003/0161313 A1 | 8/2003 | Jinmei et al. | |
| 2003/0189919 A1 | 10/2003 | Gupta et al. | |
| 2003/0202506 A1 | 10/2003 | Perkins et al. | |
| 2003/0219030 A1 | 11/2003 | Gubbi | |

(56) References Cited

U.S. PATENT DOCUMENTS

| | | |
|---|---|---|
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0091794 A1 | 4/2007 | Filsfils et al. |
| 2007/0121486 A1 | 5/2007 | Guichard et al. |
| 2007/0130325 A1 | 6/2007 | Lesser |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0144532 A1 | 6/2008 | Chamarajanagar et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0154463 A1 | 6/2009 | Hines et al. |
| 2009/0247204 A1 | 10/2009 | Sennett et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0300615 A1 | 11/2012 | Kempf et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0054763 A1 | 2/2013 | Merwe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0173788 A1 | 7/2013 | Song |
| 2013/0182712 A1 | 7/2013 | Aguayo et al. |
| 2013/0191688 A1* | 7/2013 | Agarwal ............ H04L 41/0873 714/32 |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0286846 A1 | 10/2013 | Atlas et al. |
| 2013/0301642 A1 | 11/2013 | Radhakrishnan et al. |
| 2013/0308444 A1 | 11/2013 | Sem-Jacobsen et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271104 A1 | 9/2015 | Chikkamath et al. |
| 2015/0271303 A1 | 9/2015 | Neginhal et al. |
| 2015/0312142 A1 | 10/2015 | Barabash et al. |

(56) References Cited

U.S. PATENT DOCUMENTS

| | | |
|---|---|---|
| 2015/0334696 A1 | 11/2015 | Gu et al. |
| 2015/0349978 A1 | 12/2015 | Wu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0037434 A1 | 2/2016 | Gopal et al. |
| 2016/0072669 A1 | 3/2016 | Saavedra |
| 2016/0080502 A1 | 3/2016 | Yadav et al. |
| 2016/0105392 A1 | 4/2016 | Thakkar et al. |
| 2016/0105471 A1 | 4/2016 | Nunes et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0255169 A1 | 9/2016 | Kovvuri et al. |
| 2016/0261495 A1 | 9/2016 | Xia et al. |
| 2016/0261639 A1 | 9/2016 | Xu |
| 2016/0269926 A1 | 9/2016 | Sundaram |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0352588 A1 | 12/2016 | Subbarayan et al. |
| 2016/0359738 A1 | 12/2016 | Sullenberger et al. |
| 2016/0366187 A1 | 12/2016 | Kamble |
| 2016/0380886 A1 | 12/2016 | Blair et al. |
| 2017/0005986 A1 | 1/2017 | Bansal et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104755 A1 | 4/2017 | Arregoces et al. |
| 2017/0118173 A1 | 4/2017 | Arramreddy et al. |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0289002 A1 | 10/2017 | Ganguli et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0374174 A1 | 12/2017 | Evens et al. |
| 2018/0006995 A1 | 1/2018 | Bickhart et al. |
| 2018/0007123 A1 | 1/2018 | Cheng et al. |
| 2018/0014051 A1 | 1/2018 | Phillips et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0114569 A1 | 4/2018 | Strachan et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |

(56) References Cited

U.S. PATENT DOCUMENTS

| | | | |
|---|---|---|---|
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238449 A1 | 8/2019 | Michael et al. |
| 2019/0238450 A1 | 8/2019 | Michael et al. |
| 2019/0268421 A1 | 8/2019 | Markuze et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0313907 A1 | 10/2019 | Khachaturian et al. |
| 2019/0319847 A1 | 10/2019 | Nahar et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0153736 A1 | 5/2020 | Liebherr et al. |
| 2020/0177503 A1 | 6/2020 | Hooda et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1* | 7/2020 | Jain ................... H04L 12/4641 |
| 2020/0244721 A1 | 7/2020 | S et al. |
| 2020/0267184 A1 | 8/2020 | Vera-Schockner |
| 2020/0280587 A1 | 9/2020 | Janakiraman et al. |
| 2020/0296026 A1 | 9/2020 | Michael et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2021/0006490 A1 | 1/2021 | Michael et al. |
| 2021/0029088 A1 | 1/2021 | Mayya et al. |

FOREIGN PATENT DOCUMENTS

| | | | |
|---|---|---|---|
| EP | 3509256 A1 | 7/2019 |
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020018704 A1 | 1/2020 |
| WO | 2020101922 A1 | 5/2020 |

OTHER PUBLICATIONS

Non-Published Commonly Owned U.S. Appl. No. 16/945,867, filed Aug. 1, 2020, 30 pages, Nicira, Inc.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-published Commonly Owned U.S. Appl. No. 16/656,555, filed Oct. 17, 2019, 40 pages, Nicira, Inc.
Non-Published Commonly Owned U.S. Appl. No. 16/662,363, filed Oct. 24, 2019, 129 pages, VMware, Inc.
Non-Published Commonly Owned U.S. Appl. No. 16/662,379, filed Oct. 24, 2019, 123 pages, VMware, Inc.
Non-Published Commonly Owned U.S. Appl. No. 16/662,402, filed Oct. 24, 2019, 128 pages, VMware, Inc.
Non-Published Commonly Owned U.S. Appl. No. 16/662,427, filed Oct. 24, 2019, 165 pages, VMware, Inc.
Non-Published Commonly Owned U.S. Appl. No. 16/662,489, filed Oct. 24, 2019, 165 pages, VMware, Inc.
Non-Published Commonly Owned U.S. Appl. No. 16/662,510, filed Oct. 24, 2019, 165 pages, VMware, Inc.
Non-Published Commonly Owned U.S. Appl. No. 16/662,531, filed Oct. 24, 2019, 135 pages, VMware, Inc.
Non-Published Commonly Owned U.S. Appl. No. 16/662,570, filed Oct. 24, 2019, 141 pages, VMware, Inc.
Non-Published Commonly Owned U.S. Appl. No. 16/662,587, filed Oct. 24, 2019, 145 pages, VMware, Inc.
Non-Published Commonly Owned U.S. Appl. No. 16/662,591, filed Oct. 24, 2019, 130 pages, VMware, Inc.
Non-published Commonly Owned U.S. Appl. No. 16/699,719, filed Dec. 1, 2019, 42 pages, Nicira, Inc.
Non-published Commonly Owned U.S. Appl. No. 16/721,964, filed Dec. 20, 2019, 39 pages, VMware, Inc.
Non-published Commonly Owned U.S. Appl. No. 16/724,154, filed Dec. 20, 2019, 27 pages, Nicira, Inc.
Non-published Commonly Owned U.S. Appl. No. 16/785,628, filed Feb. 9, 2020, 44 pages, Nicira, Inc.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Non-published Commonly Owned U.S. Appl. No. 15/803,964, filed Nov. 6, 2017, 15 pages, The Mode Group.
Non-published Commonly Owned U.S. Appl. No. 16/216,235, filed Dec. 11, 2018, 19 pages, The Mode Group.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

* cited by examiner

| Endpoint ID | IP Address |
|---|---|
| EP1 | IP Add A |
| EP3 | IP Add C |
| EP4 | IP Add D |
| EP7 | IP Add G |
| EP8 | IP Add H |

White List — 610

| Endpoint ID | IP Address |
|---|---|
| EP2 | IP Add B |
| EP5 | IP Add E |
| EP6 | IP Add F |

Black List — 605

MANAGING FORWARDING ELEMENTS AT EDGE NODES CONNECTED TO A VIRTUAL NETWORK

RELATED APPLICATIONS

Benefit is claimed under 35 U.S.C. 119(a)-(d) to Foreign Application Serial No. 201941043654 filed in India entitled "MANAGING FORWARDING ELEMENTS AT EDGE NODES CONNECTED TO A VIRTUAL NETWORK", on Oct. 28, 2019, by VMWARE, INC., which is herein incorporated in its entirety by reference for all purposes.

In recent years, several companies have brought to market solutions for deploying software-defined (SD) wide-area networks (WANs) for enterprises. Some such SD-WAN solutions use external third-party private or public cloud datacenters (clouds) to define different virtual WANs for different enterprises. These solutions typically have edge forwarding elements (called edge devices) at edge nodes of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The edge nodes include branch offices (called branches) of the enterprise, and these offices are often spread across geographies with network links to the gateways of various different network connectivity types. These network links often exhibit varying network path characteristics with respect to packet loss, latency, jitter, etc. Such multi-site connectivity in SD-WAN implementation needs to be reliable and resilient.

BRIEF SUMMARY

Some embodiments of the invention provide a method for maintaining a virtual network that spans at least one cloud datacenter separate from multi-machine edge nodes of an entity. This method configures a gateway in the cloud datacenter to establish secure connections with several edge devices at several multi-machine edge nodes (e.g., branch offices, datacenters, etc.) in order to establish the virtual network. The method configures the gateway to assess the quality of the connection links with different edge devices, and to terminate a secure connection with a particular edge device for a duration of time after the assessed quality of the connection link to the particular edge device is worse than a threshold value.

In some embodiments, the gateway is configured to distribute routes to edge devices at the edge nodes, and to forgo distributing any route to the particular edge device along the connection link for the duration of time when the assessed quality of the connection link is worse than (e.g., less than) a threshold value. In different embodiments, the gateway assesses the quality of the connection link based on different factors or different combination of factors. Examples of such factors, in some embodiments, include the following attributes of a connection link: packet loss, latency, signal jitter, etc. Also, the routes that the gateway distributes in some embodiments include routes that the edge devices distribute to the gateway, as well as routes that the gateway learns on its own.

In some embodiments, the particular edge device has connections with first and second gateways in first and second cloud datacenters. After the quality of the network link that connects the particular edge device to the first gateway degrades, the particular edge device does not receive routes from the first gateway. In some embodiments, this is achieved by the first gateway terminating the secure connection with the particular edge device and not establishing a new connection for a duration of time. However, during this period, the particular edge device can continue to receive routes from the second gateway in the second cloud datacenter, as the secure connection between the particular edge device and the second gateway uses a network link that is good.

In some embodiments, the particular edge device connects to several external networks through several network links comprising first and second network links. In some embodiments, examples of such external network links include a commercial broadband Internet link, a wireless telecommunication link, and an MPLS link. When the particular edge device connects to the first gateway through first and second network connection links, with the first connection link having an assessed quality that is worse than a threshold value while the second connection link has a quality that is better than the threshold value, the first gateway can continue to distribute routes to the particular edge device through the second connection link.

To reject connection requests from the particular edge device for the duration of time, the gateway adds the particular edge device to a blacklist that includes the edge device to which the gateway should not accept secure connection requests. In some embodiments, each edge device on the blacklist is identified in terms of a network address that is associated with a network link that is connected to the edge devices. The gateway device removes the particular edge device from the blacklist after the duration of time In some embodiments, the gateway detects an anomaly in routes that are maintained at a particular edge device, and directs the particular edge device to perform a route reset operation to re-identify routes across the virtual network. The gateway detects the anomaly in some embodiments by detecting a drop in a number of routes maintained at the particular edge device that is larger than a threshold value. In some embodiments, the gateway stores an old list of routes that are maintained at the particular edge node. It then identifies a new list of routes that are maintained at the particular edge node, and compares these two lists to identify routes in the old list that are not in the new list. When more than the threshold value of routes is missing from the new list, the gateway specifies that an anomaly has been detected. In some embodiments, the gateway obtains the new list of routes from the particular edge node. Also, in some embodiments, the gateway stores the new list as the old list when changes to the new list do not exceed a threshold value.

The particular edge node, in some embodiments, is configured to exchange routes with another edge node. In some such embodiments, the detected anomaly can be caused by race conditions that incorrectly cause the particular edge node to filter out a subset of the routes when synchronizing routes with the other edge node. These two edge nodes are configured, in some embodiments, to establish a tunnel through which the two edge nodes forward data messages and forward the routes used to forward data messages to each other and to one or more gateways and/or other edge devices. In some embodiments, these two edge nodes are configured in a hub/spoke topology.

When the particular edge device performs the route reset operation, the particular edge device in some embodiments directs at least one other edge to synchronize the set of routes maintained by the other edge with the particular edge device. Conjunctively, or alternatively, the particular edge device in some embodiments performs the route reset operation by directing the anomaly-detecting gateway or another gateway to synchronize the set of routes maintained by the gateway with the particular edge device. In some embodiments, these routes are routes identified by one or more other edge devices and/or one or more gateways.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for maintaining a virtual network that spans at least one cloud datacenter separate from multi-machine edge nodes of an entity. In some embodiments, this method is implemented by a gateway in the cloud datacenter. This gateway is configured to establish secure connections with several edge devices at several multi-machine edge nodes (e.g., branch offices, datacenters, etc.) in order to establish the virtual network. According to this method, the gateway assesses the quality of connection links with different edge devices, and terminates a secure connection with a particular edge device for a duration of time when the assessed quality of the connection link to the particular edge device is worse than a threshold value.

In some embodiments, the gateway is configured to distribute routes to edge devices at the edge nodes, and to forgo distributing any route to the particular edge device along the connection link for the duration of time when the assessed quality of the connection link is worse than (e.g., less than) a threshold value. In different embodiments, the gateway assesses the quality of the connection link based on different factors or different combination of factors. Examples of such factors in some embodiments include the following attributes of a connection link: packet loss, latency, signal jitter, etc. Also, the routes that the gateway distributes in some embodiments include routes that the edge devices distribute to the gateway, as well as routes that the gateway learns on its own.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model.

Figure 1:
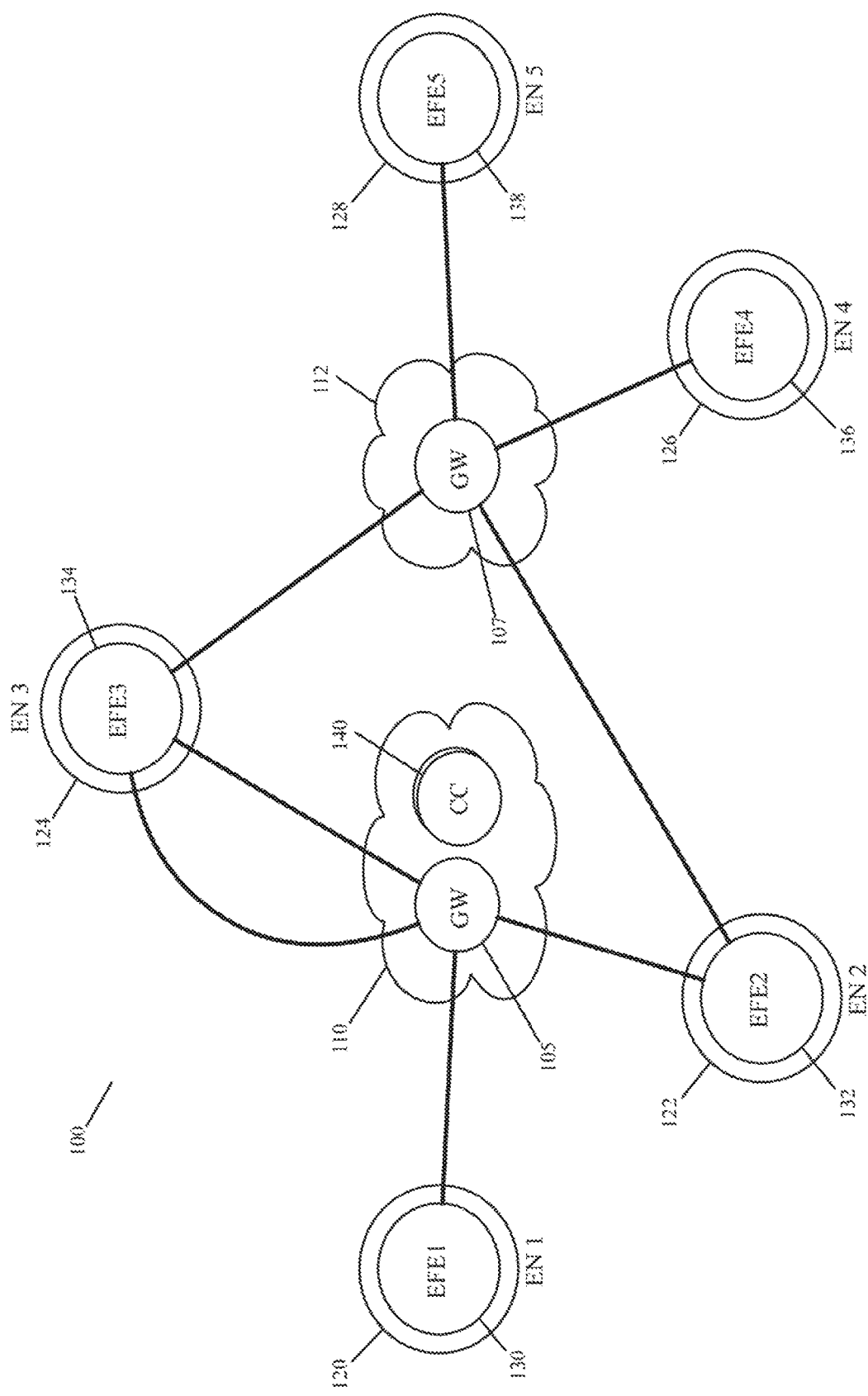
FIG. 1 illustrates an example of a virtual network that is created for a particular entity by two gateways that are deployed in two different public cloud datacenters of two different public cloud providers.

FIG. 1 illustrates an example of a virtual network 100 that is created for a particular entity by two gateways 105 and 107 that are deployed in two different public cloud datacenters 110 and 112 of two different public cloud providers. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In FIG. 1, the gateways are multi-tenant forwarding elements that can be used to establish secure connection links (e.g., tunnels) with edge forwarding elements at the particular entity's multi-machine sites, such as branch offices, datacenters, etc. These multi-machine sites are often at different physical locations (e.g., different buildings, different cities, different states, etc.) and are referred to below as multi-machine edge nodes.

Five such edge nodes 120-128 are illustrated in FIG. 1. Each of these edge nodes is shown to include at least one edge forwarding element 130-138 that exchanges data messages with one or more gateways through one or more secure connection links between the edge forwarding element and the gateway(s). As shown by edge node 124 and gateway 105, multiple secure connection links (e.g., multiple secure tunnels) can be established between one edge node and a gateway. When multiple such links are defined between an edge node and a gateway, each secure connection link in some embodiments is associated with a different physical network link between the edge node and an external network. For instance, to access external networks, an edge node in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), as further described below by reference to FIG. 4.

In FIG. 1, each gateway is used to connect two edge nodes through at least two secure connection links between the gateway and the two edge forwarding elements at the two edge nodes. In some embodiments, each secure connection link is formed as a VPN (virtual private network) tunnel between the gateway and an edge forwarding element. The collection of the edge forwarding elements, gateways, and the secure connections between the edge forwarding elements and the gateways forms the virtual network 100 for the particular entity that spans the two public cloud datacenters 110 and 112 to connect the edge nodes 120-128.

In some embodiments, secure connection links are defined between gateways to allow paths through the virtual network to traverse from one public cloud datacenter to another, while no such links are defined in other embodiments. Also, as the gateways 105 and 107 are multi-tenant gateways, they are used in some embodiments to define other virtual networks for other entities (e.g., other companies, organizations, etc.). Some such embodiments use tenant identifiers to create tunnels between a gateway and edge forwarding elements of a particular entity, and then use tunnel identifiers of the created tunnels to allow the gateway to differentiate data message flows that it receives from edge forwarding elements of one entity from data message flows that it receives along other tunnels of other entities. In other embodiments, the gateways are single tenant and are specifically deployed to be used by just one entity.

FIG. 1 illustrates a cluster of controllers 140 in the public cloud datacenter 110. This controller cluster 140 serves as a central point for managing (e.g., defining and modifying) configuration data that is provided to the edge nodes and/or gateways to configure some or all of the operations. In some embodiments, the controller cluster 140 has a set of manager servers that define and modify the configuration data, and a set of controller servers that distribute the configuration data to the edge forwarding elements and/or gateways. In some embodiments, the controller cluster 140 directs edge forwarding elements to use certain gateways (i.e., assigns gateway to the edge forwarding elements).

Although FIG. 1 illustrates the controller cluster 140 residing in one public cloud datacenter 110, the controllers in some embodiments reside in multiple different public cloud datacenters and/or in a private cloud datacenter. Also, some embodiments deploy one or more gateways in one or more private cloud datacenters, e.g., datacenters of the entity that deploys the gateways and provides the controllers for configuring the gateways to implement virtual networks.

Figure 2:
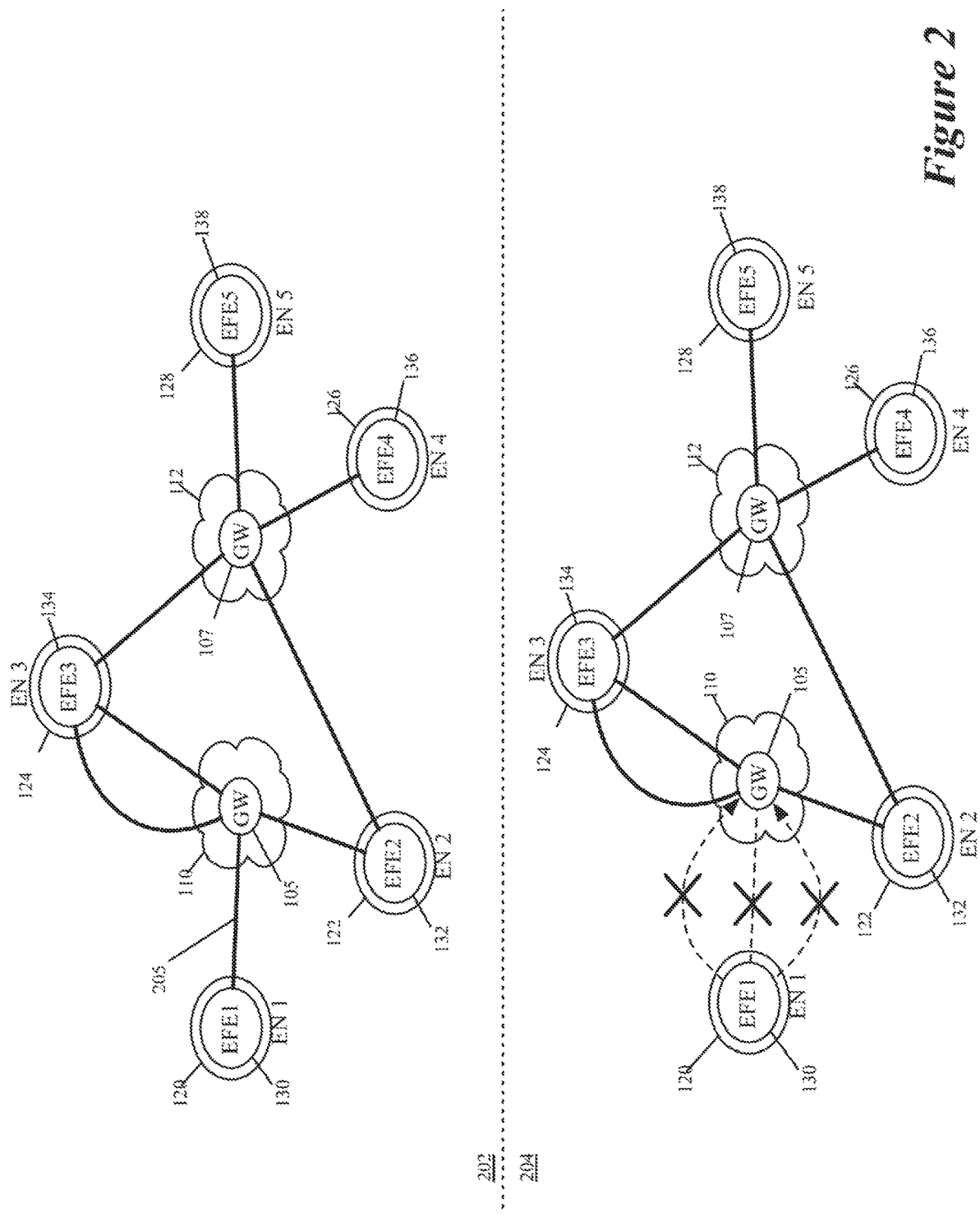
FIG. 2 presents an example that illustrates the gateway terminating its secure connection with the edge forwarding element when it assesses that the quality of the network connection with this forwarding element has deteriorated by more than an acceptable amount.

FIG. 2 presents an example that illustrates the gateway 105 terminating its secure connection with the edge forwarding element 130 when it assesses that the quality of the network connection with this forwarding element has deteriorated by more than an acceptable amount. As further described below, each gateway iteratively performs a set of measurement operations that assess the quality of the network link used by an edge forwarding element to establish a secure connection link with the gateway. In some embodiments, these measurements quantify a number of factors (such as connectivity speed, packet loss, signal jitter, etc.) from which the gateway generates a score that quantifies the quality of a network connection.

FIG. 2 presents its example in two stages. In a first stage 202, the gateway 105 is shown to have a secure connection 205 with the edge forwarding element 130. Through this secure connection, the edge forwarding element 130 connects its edge node 120 to the virtual network 100 established by the gateways 105 and 107, the edge forwarding elements 130-138, and their secure connections.

In the second stage 204, the gateway 105 detects an unacceptable deterioration of service in the network connection that the edge forwarding element 130 uses for the secure connection 205. Hence, as shown, the gateway 105 terminates this connection link and rejects subsequent requests from the edge forwarding element 130 for a duration of time. The gateway takes these actions in order to prevent an edge forwarding element with a weak network connection from adversely affecting the performance of the virtual network.

For instance, in some embodiments, the gateways operate as route reflectors that obtain routes (i.e., definitions of routes) through the virtual network from other gateways and/or edge forwarding elements, and distribute these routes to other edge forwarding elements. In some embodiments, the gateways also distribute routes that they learn on their own. Distribution of routes, however, can become problematic when one edge node has a poor network connection with the gateway that distributes the routes. For instance, because of a poor connection, a gateway might have to iteratively try to transmit a new set of routes to the edge node with the poor network connection, only to fail iteratively. Such iterative operations, in turn, can adversely affect other operations of the gateway (e.g., data message processing delay or data message loss).

Hence, after detecting that the quality of the connection link with the edge forwarding element 130 has degraded below an acceptable amount, the gateway 105 terminates the secure connection link 205 with this forwarding element, and places this forwarding element on its blacklist for a duration of time so that it rejects all attempts by this forwarding element to establish the secure connection link 205 again. With this connection link down, the gateway forgoes forwarding routes to the edge forwarding element 130 for a duration of time.

Figure 3:
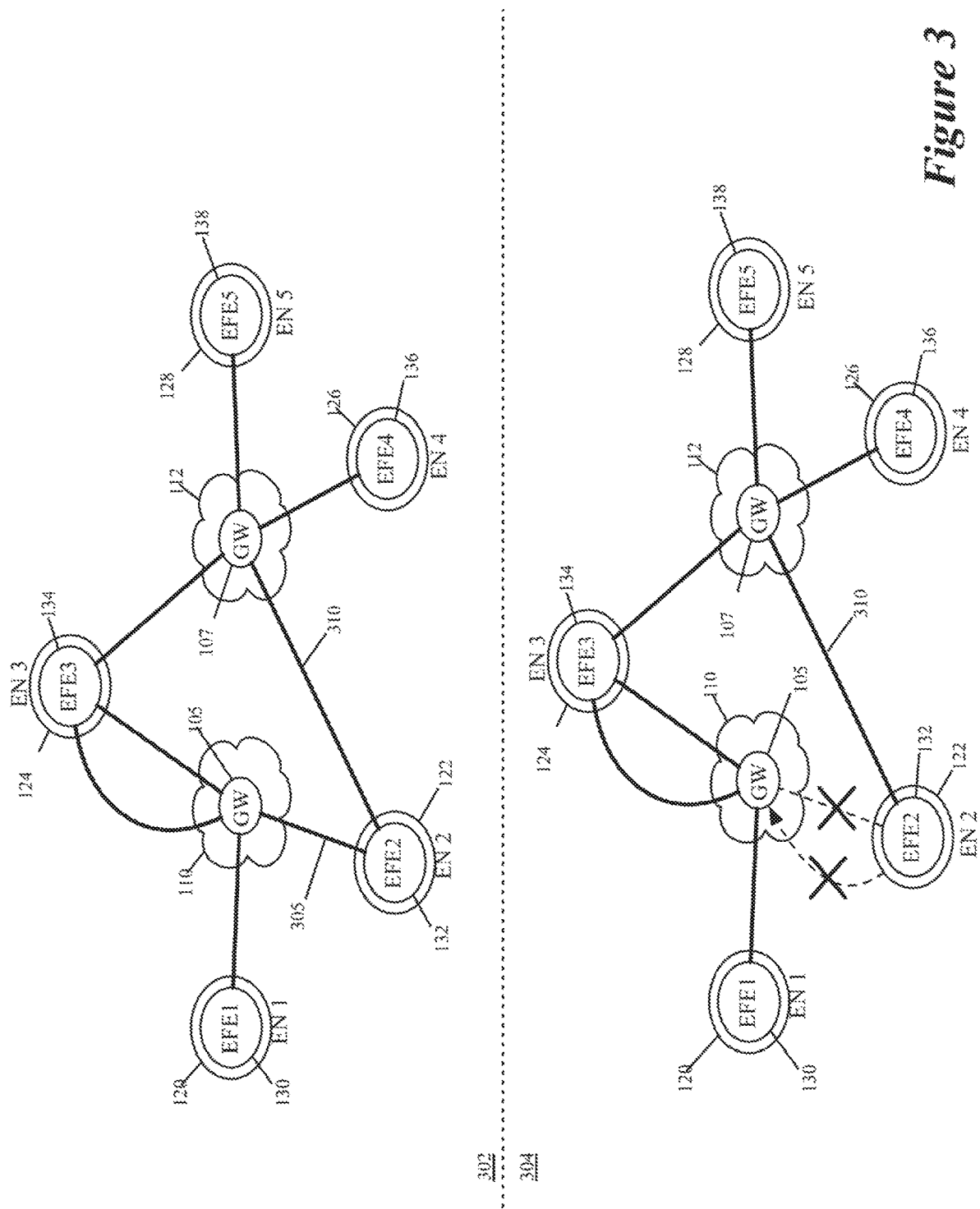
FIG. 3 presents an example that illustrates an edge forwarding element with a poor network connection to one gateway connecting to the virtual network through another gateway.

After a gateway terminates a connection link with a particular edge forwarding element for a duration of time, that forwarding element and its corresponding multi-machine edge node can connect to the virtual network through another connection link with the same gateway or a connection link with another gateway, so long as these other connection links do not suffer from poor network connectivity (i.e., so long as the physical network link for these other connections still meets acceptable performance metrics). FIG. 3 presents an example that illustrates an edge forwarding element with a poor network connection to one gateway connecting to the virtual network 100 through another gateway. Again, this example is illustrated in two stages 302 and 304.

The first stage 302 shows the edge forwarding element 132 connecting to the virtual network 100 through two secure connection links 305 and 310 to the gateways 105 and 107. The second stage 304 then shows the gateway 105 detecting an unacceptable deterioration of service in the network connection that the edge forwarding element 132 uses for the secure connection 305, terminating this connection link and rejecting subsequent requests from the edge forwarding element 132 for a duration of time. Again, the gateway 105 takes these actions in order to prevent the edge forwarding element 132 with a weak network connection from adversely affecting the performance of the virtual network 100.

The second stage 304 also shows that while the gateway 105 terminates its connection with the edge forwarding element 132 for a duration of time, the gateway 107 maintains its connection link 310 with this edge forwarding element 132 during this time period. This is because, during this time period, the quality of the network link that is used for the connection link 310 does not degrade to an extent that would require the gateway 107 to terminate this link. Hence, during this period, the edge forwarding element 132 can connect to the virtual network 100 through the gateway 107. Through this connection, the edge forwarding element 132 can continue to receive routes from the gateway 107 for the virtual network 100.

Figure 4:
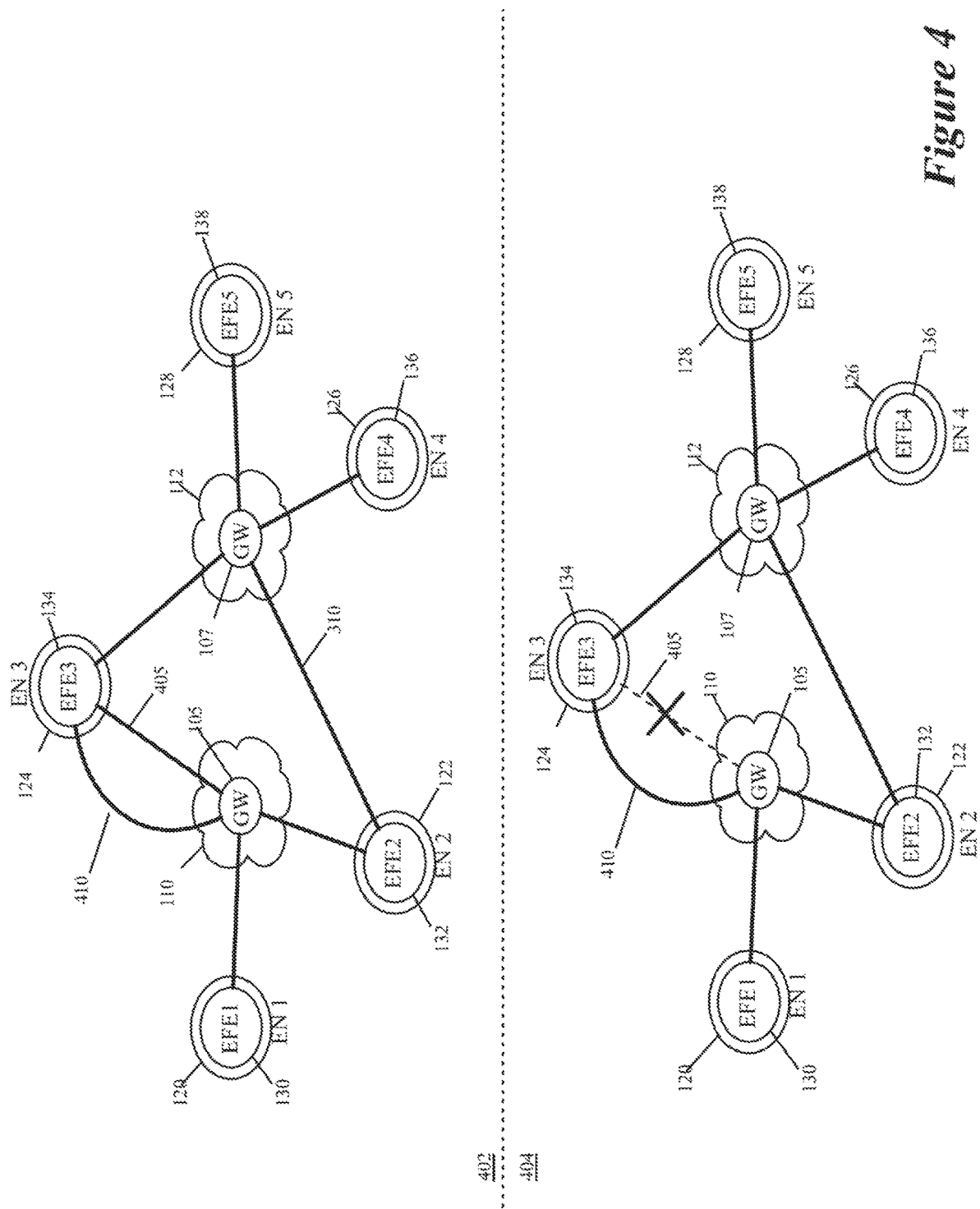
FIG. 4 presents an example that illustrates that, after a gateway terminates a connection link with the edge forwarding element for a duration of time, this forwarding element can connect to the virtual network through another connection link with the same gateway.

FIG. 4 presents an example that illustrates that after the gateway 105 terminates a connection link 405 with the edge forwarding element 134 for a duration of time, this forwarding element 134 can connect to the virtual network 100 through another connection link 410 with the same gateway 105. This example is illustrated in two stages 402 and 404. The first stage 402 shows the edge forwarding element 134 connecting to the virtual network 100 through two secure connection links 405 and 410 to the gateway 105. In this example, one connection link 405 uses a cable modem to access the gateway 105 through the Internet, while the other connection link 410 uses an MPLS device to reach the gateway 105 through an MPLS network.

The second stage 404 shows the gateway 105 detecting an unacceptable deterioration of service for the connection link 405, terminating this connection link, and rejecting subsequent requests from the edge forwarding element 134 for a duration of time to re-establish this connection link. The gateway 105 takes these actions in order to prevent the weak network connectivity that is used by edge forwarding element 134 for this connection link 405 from adversely affecting the performance of the virtual network.

The second stage 404 also shows that while the gateway 105 terminates its connection link 405 with the edge forwarding element 134 for a duration of time, this gateway 105 maintains its connection link 410 with this edge forwarding element 134 during this time period. This is because, during this time period, the quality of the network link that is used for the connection link 410 does not degrade to an extent that would require the gateway 105 to terminate this link. Hence, during this period, the edge forwarding element 134 can connect to the virtual network 100 through the gateway 105 and the connection link 410. Through this connection link, the edge forwarding element 134 can continue to receive routes from the gateway 105 for the virtual network 100.

Figure 5:
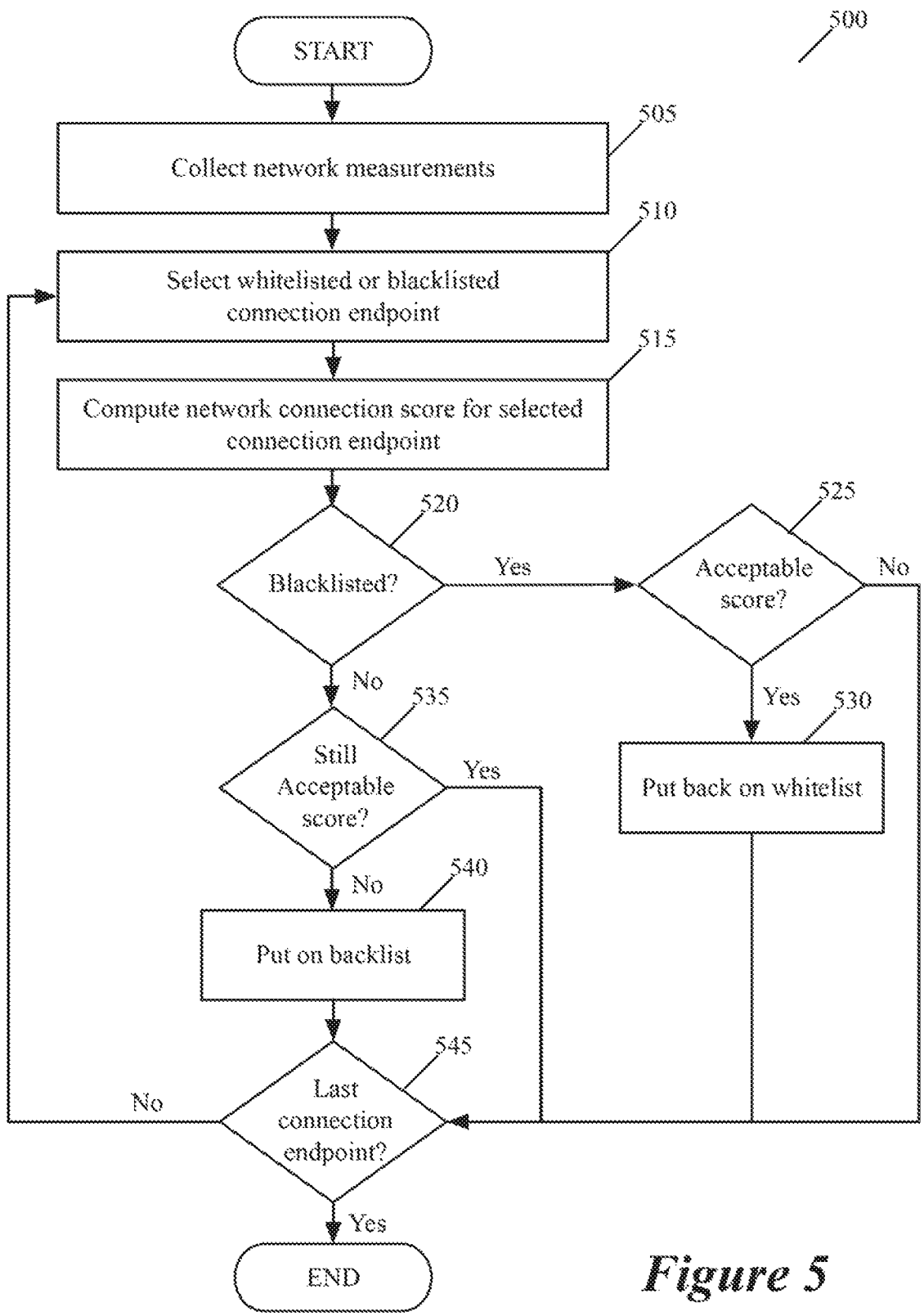
FIG. 5 illustrates a process that a gateway periodically performs in some embodiments to maintain its sets of whitelisted connection endpoints and blacklisted connection endpoints.

FIG. 5 illustrates a process 500 that a gateway periodically performs in some embodiments to maintain its sets of whitelisted connection endpoints and blacklisted connection endpoints. In some embodiments, the gateway performs this process once every N (e.g., 30, 60, 120, 240, etc.) minutes. As shown, the process 500 collects (at 505) network measurements that one or more measurement agents associated with the gateway have produced since the last time that the gateway performed the process 500. These network measurements express the quality of the network connections between the gateway and candidate edge endpoints for the gateway. The candidate edge endpoints for the gateway are specified in terms of their network addresses (e.g., IP addresses) in some embodiments.

The measurement agent set in some embodiments is co-located with the gateway in the same datacenter, so that the measurements that this set produces accurately reflect the network connections that the gateway experiences with its set of candidate edge endpoints. The measurement agent set, in some embodiments, produces a set of network measurements for each candidate edge endpoint for the gateway. For each candidate edge endpoint of the gateway, the measurement agent set produces several different types of network measurements in some embodiments. These measurements include data message delay, data message loss, signal jitter, etc. Examples of taking such measurements are further described in U.S. Pat. No. 9,722,815, which is incorporated herein by reference.

The gateway's candidate edge endpoints are specified in terms of their network addresses (e.g., IP addresses) on a candidate edge endpoint list that the gateway receives from the controller cluster as part of its configuration data. The gateway might have an active connection session with an edge endpoint on this candidate edge endpoint list, in which case the candidate edge endpoint is on the gateway's whitelist of endpoints. Alternatively, a candidate edge endpoint might be on the gateway's blacklist of endpoints when it is a candidate edge endpoint to connect with the gateway, but the gateway has determined that it should not connect to the edge endpoint for a duration of time.

After collecting (at 505) the network measurements, the process selects a candidate edge endpoint that is on its list of candidate edge endpoints. This endpoint might be on the whitelisted endpoint list or the blacklisted endpoint list of the gateway, depending on whether the gateway previously blacklisted the endpoint based on its poor network connection. At 515, the process computes a weighted score for the edge endpoint selected at 510 by using a series of weight values to combine different network measurements that the process has collected for the selected endpoint. In some embodiments, the computed score also accounts for scores that the process 500 previously computed for the selected edge endpoint in its previous iterations. In some such embodiments, the process 500 uses another set of weight values to combine the weighted sum produced with the most recent collected measurements with scores computed for the selected endpoint in the previous iterations of the process 500.

Next, at 520, the process determines whether the selected endpoint has been blacklisted (i.e., whether it is on the gateway blacklist of endpoints). If so, the process determines (at 525) whether the score computed at 515 is now an acceptable score for removing the candidate endpoint from the blacklist. Such a score would indicate that the network connection of the candidate endpoint has improved enough to be considered a good network connection. When the computed score is deemed (at 525) to be acceptable, the process 500 places (at 530) the candidate endpoint on the gateway's whitelist and then transitions to 545. The process also transitions to 545 when it determines (at 525) that the computed score is not acceptable.

When the process determines (at 520) that the selected endpoint has not been blacklisted (i.e., determines that the selected endpoint is on the gateway's whitelist of endpoints), the process determines (at 535) whether the score computed at 515 is still an acceptable score for keeping the candidate endpoint on the gateway's whitelist. When such a score is not acceptable, it would be indicative that the network connection of the selected candidate endpoint has deteriorated too much for it to be considered a good network connection. When the computed score is deemed (at 535) not to be acceptable, the process 500 places (at 540) the candidate endpoint on the gateway's blacklist and then transitions to 545. The process also transitions to 545 when it determines (at 535) that the computed score is still acceptable.

At 545, the process determines whether it has examined all the connection endpoints on its list of candidate endpoints. If not, it returns to 510 to select another candidate endpoint and to repeat its operations for this newly selected endpoint. When the process determines (at 545) that it has examined all the connection endpoints, the process 500 ends.

Figures 6, 7:
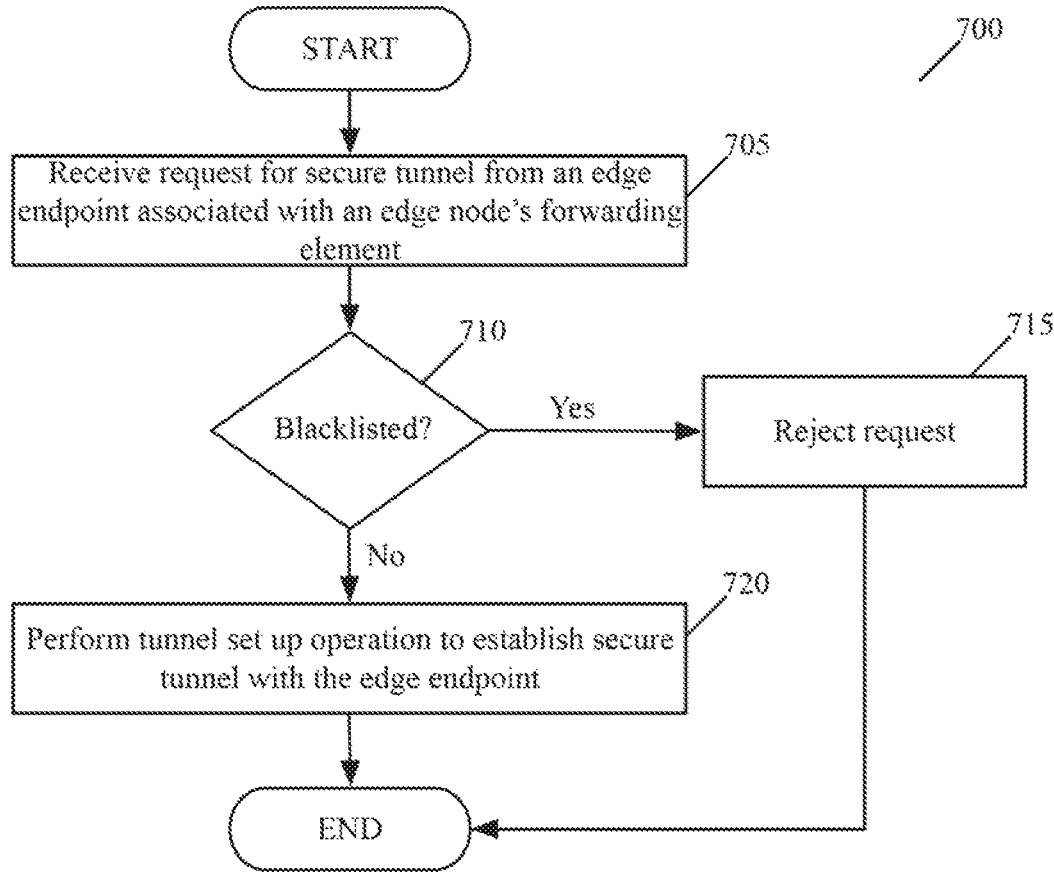
FIG. 6 illustrates examples of a blacklist and a whitelist of a gateway.
FIG. 7 illustrates a process that a gateway performs in some embodiments to establish a secure connection with an edge endpoint of an edge node's forwarding element.

FIG. 6 illustrates examples of a blacklist 605 and a whitelist 610 of a gateway. As shown, each list specifies an endpoint identifier along with an endpoint network address. As described above, the gateway will reject connection requests from endpoints on the blacklist. The gateway will forgo performing certain operations (e.g., route re-distributions) for endpoints on the blacklist. In other words, the gateway will perform certain operations (e.g., route re-distributions) for endpoints on the whitelist.

FIG. 7 illustrates a process 700 that a gateway performs in some embodiments to establish a secure connection with an edge endpoint of an edge node's forwarding element. As shown, the process 700 starts when the gateway receives (at 705) a connection request from an edge endpoint associated with an edge node's forwarding element. Next, at 710, the process 700 determines whether the edge endpoint is on its blacklist. In some embodiments, the process makes this determination (at 710) by determining whether the network address of the requesting forwarding element is on its blacklist.

If so, the process rejects (at 715) this request, and then ends. Otherwise, the process performs (at 720) a tunnel set-up operation to establish a secure tunnel with the requesting edge endpoint, and then ends. In some embodiments, this tunnel that is defined requires the gateway and the edge endpoint to exchange control signals (e.g., BFD signals) to ensure that the tunnel is operational (i.e., to ensure that the endpoints of the tunnels and their intervening connection are still operational). In other embodiments, the tunnel defined at 720 does not need its endpoints to exchange control signals.

Figure 8:
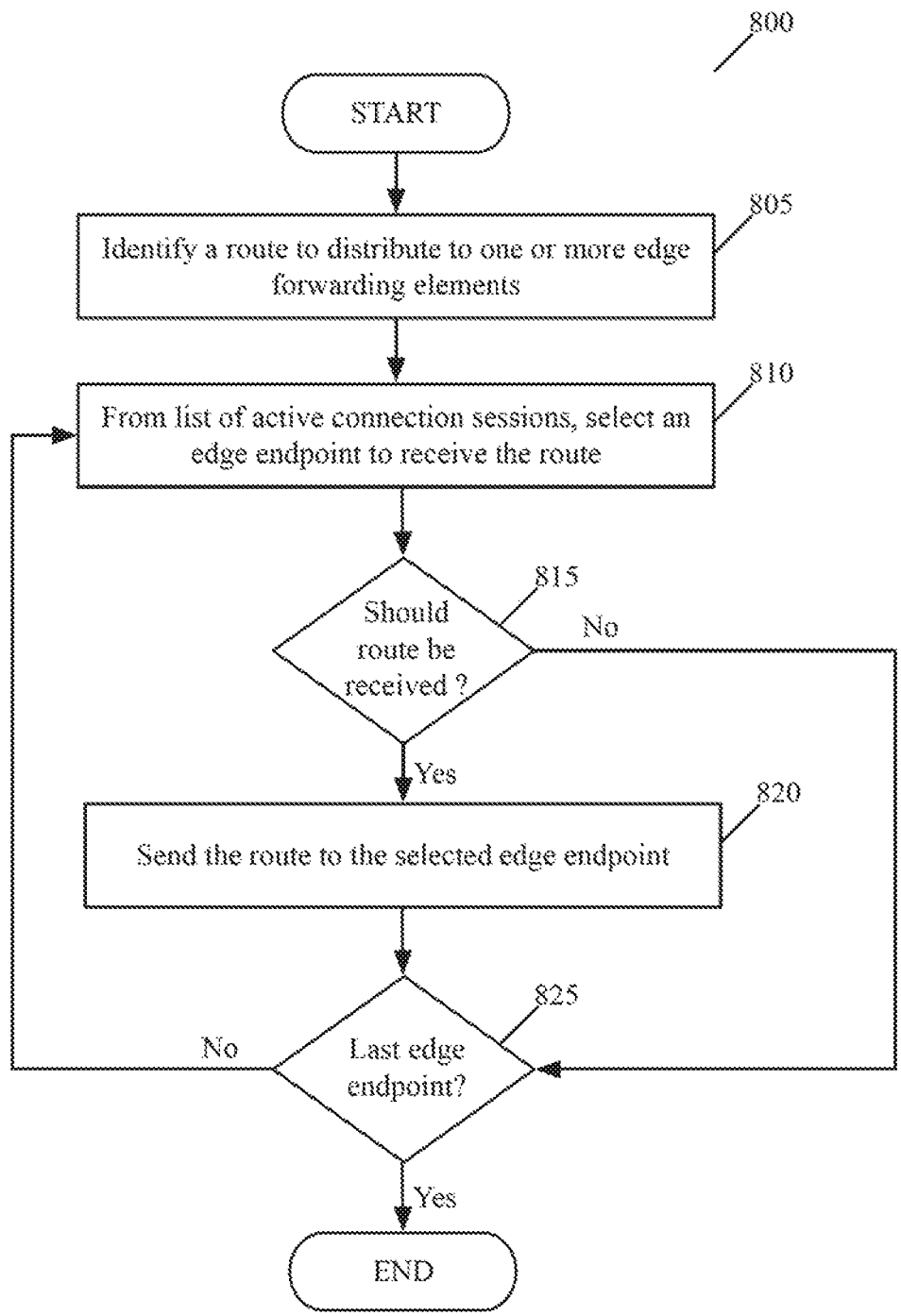
FIG. 8 illustrates a process that a gateway performs to distribute a route to edge forwarding elements.

FIG. 8 illustrates a process 800 that a gateway performs to distribute a route to edge forwarding elements. In some embodiments, the gateways perform this operation as they serve as route reflectors that remove or reduce the amount of routes that the edge forwarding elements have to distribute to other edge forwarding elements. In some embodiments, the gateway performs this process 800 each time it identifies that it has received a new route from another device (e.g., another edge forwarding element, another gateway, etc.) for a particular entity. The gateway in some embodiments receives new routes from other devices dynamically through one or more routing protocols, such as standard protocols, like BGP (Border Gateway Protocol) and OSPF (Open Shortest Path First), or proprietary protocols, like VCRP (Velocloud Routing Protocol). VCRP is described in U.S. Published Patent Application 2017/0237710, which is incorporated herein by reference.

In some embodiments, the routes are defined in terms of next-hop forwarding records, with each record having a match criteria and a forwarding network address. In some embodiments, the match criteria can be specified just in terms of a destination IP address, or in terms of additional header values (e.g., other five tuple header values, such as source IP address, source and/or destination port addresses, protocol). After receiving route records through one of the standard or proprietary protocols, the edge forwarding element builds its routing table (e.g., builds it FIB, forwarding information base) based on the received routing tables.

As shown, the process 800 starts when the gateway identifies (at 805) a route to distribute to one or more edge forwarding elements of the particular entity. From the list of active connection sessions that it maintains for the entity, the process then selects (at 810) an edge endpoint that has an active connection session with the gateway. At 815, the process then determines whether this selected edge endpoint should receive the route. The edge endpoint should not receive the route when it is the endpoint that provided the route to the gateway. The particular entity's edge endpoints that are currently blacklisted, and hence do not have current active connection sessions with the gateway, also do not get the route as they are never selected at 810.

If the selected edge endpoint should not receive the route, the process 800 transitions to 825, which will be further described below. Otherwise, the process sends (at 820) the route's information to the selected edge endpoint by using a routing protocol, such as BGP, OSPF, or VCRP. As mentioned above, the route information is distributed as next-hop route records in some embodiments. After 820, the process transitions to 825, where it determines whether it has examined all the edge endpoints associated with its current active connection sessions for the particular entity. If not, the process returns to 810 to select another edge endpoint. Otherwise, the process 800 ends.

In some embodiments, the gateway detects an anomaly in routes that are maintained at a particular edge forwarding element at a particular edge node, and based on this detection, directs the particular edge forwarding element to perform a route reset operation to re-identify routes across the virtual network. The gateway detects the anomaly in some embodiments by detecting a drop in a number of routes maintained at the particular edge forwarding element that is larger than a threshold value.

In some embodiments, the gateway stores an old list of routes that are maintained at the particular edge forwarding element. It then identifies a new list of routes that are maintained at the particular edge forwarding element, and compares these two lists to identify routes in the old list that are not in the new list. When more than the threshold value of routes are missing from the new list, the gateway specifies that an anomaly has been detected. In some embodiments, the gateway obtains the new list of routes from the particular edge forwarding element. Also, in some embodiments, the gateway stores the new list as the old list when changes to the new list do not exceed a threshold value.

In some such embodiments, the detected anomaly can be caused by race conditions that incorrectly cause the particular edge forwarding element to filter out a subset of the routes when synchronizing routes with another device (e.g., routes from another edge forwarding element). A controller cluster in some embodiments can direct one edge forwarding element to establish with another edge forwarding element a tunnel for a direct connection session so that the two edge forwarding elements can forward data messages directly. In some embodiments, edge forwarding elements can be configured in a hub/spoke topology with one edge forwarding element serving as a hub for relaying data messages between the other edge forwarding elements that are deployed as spokes in this topology. When a deployed virtual network includes a hub/spoke topology between some or all of its edge forwarding elements, race conditions that cause one edge forwarding element to filter out or to forgo building its routing table can occur, and this can result in severe degradation of services provided by the edge forwarding elements.

When the particular edge forwarding element performs the route reset operation, the particular edge forwarding element in some embodiments directs all the gateways (including the anomaly-detecting gateway) to which it connects to synchronize the routes that they maintain with the particular edge forwarding element. Conjunctively, or alternatively, the particular forwarding element in some embodiments performs the route reset operation by directing other edge forwarding elements to synchronize the routes that they maintain with the particular edge forwarding element. In some embodiments, these routes are routes identified by one or more other edge forwarding elements and/or one or more gateways.

Figure 9:
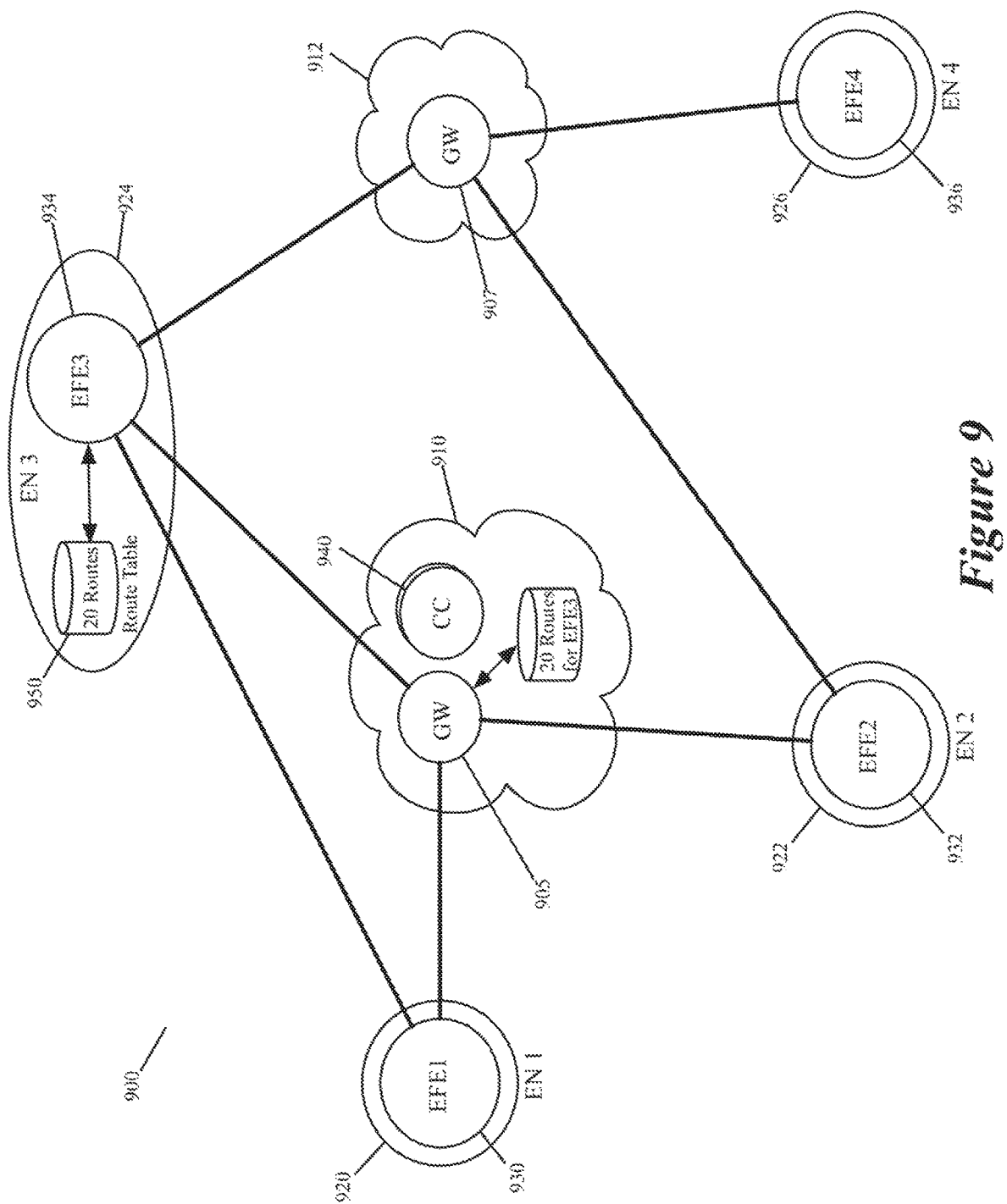
FIGS. 9-12 illustrate an example of the gateway directing an edge forwarding element to rebuild its route data for a virtual network after detecting an anomaly in the routes maintained by the forwarding element.

FIGS. 9-12 illustrate an example of the gateway directing an edge forwarding element to rebuild its route data for a virtual network after detecting an anomaly in the routes maintained by the forwarding element. FIG. 9 illustrates a virtual network 900 that is formed by two gateways 905 and 907 and four edge forwarding elements 930-936 at four edge nodes 920-926. The gateways are deployed in two public cloud datacenters 910 and 912, while the edge nodes are branch offices and/or datacenters of a particular entity (e.g., a particular corporation). Along with the gateways, a cluster of controllers 940 are also deployed in one or both of the public cloud datacenters 910 and 912.

The gateways serve as intermediate forwarding elements to define a path through the virtual network from one edge forwarding element to another edge forwarding element. The gateways also serve as route reflectors in that they distribute to the edge forwarding elements routes that they learn or routes that they obtain from other edge forwarding elements and/or other gateways. The controller cluster 940 in some embodiments provides instructions for directing the edge forwarding elements to connect to certain gateways, while in other embodiments it provides the gateways with instructions to connect to certain edge forwarding elements.

Also, in some embodiments, the gateways and/or controller cluster provide instructions (e.g., configuration data) to direct the edge forwarding elements to form direct connections with each other. In other words, one edge forwarding element in some embodiments can form a direct connection session (one that does not go through a gateway) with another edge forwarding element. In FIG. 9, the edge forwarding elements 930-932 have a direct connection session between them. Sometimes one edge forwarding element (e.g., an edge forwarding element in a datacenter) operates as a hub in a hub-spoke topology in which the other edge forwarding elements connect directly to it as spokes in the topology.

FIG. 9 shows a routing table 950 of the edge forwarding element 934 as storing twenty routes across the virtual network. Some of these routes traverse through a gateway while other routes traverse through another edge forwarding element that is directly connected to the edge forwarding element 934. As shown, the gateway 905 maintains data regarding these twenty routes that are stored by the edge forwarding element 934. In some embodiments, the gateway simply stores the number of routes maintained by the edge forwarding element 934. In other embodiments, it maintains a duplicate coup of the routes maintained by the edge forwarding element 934. In still other embodiments, it stores other data regarding the routes maintained by the edge forwarding element 934.

Figure 10:
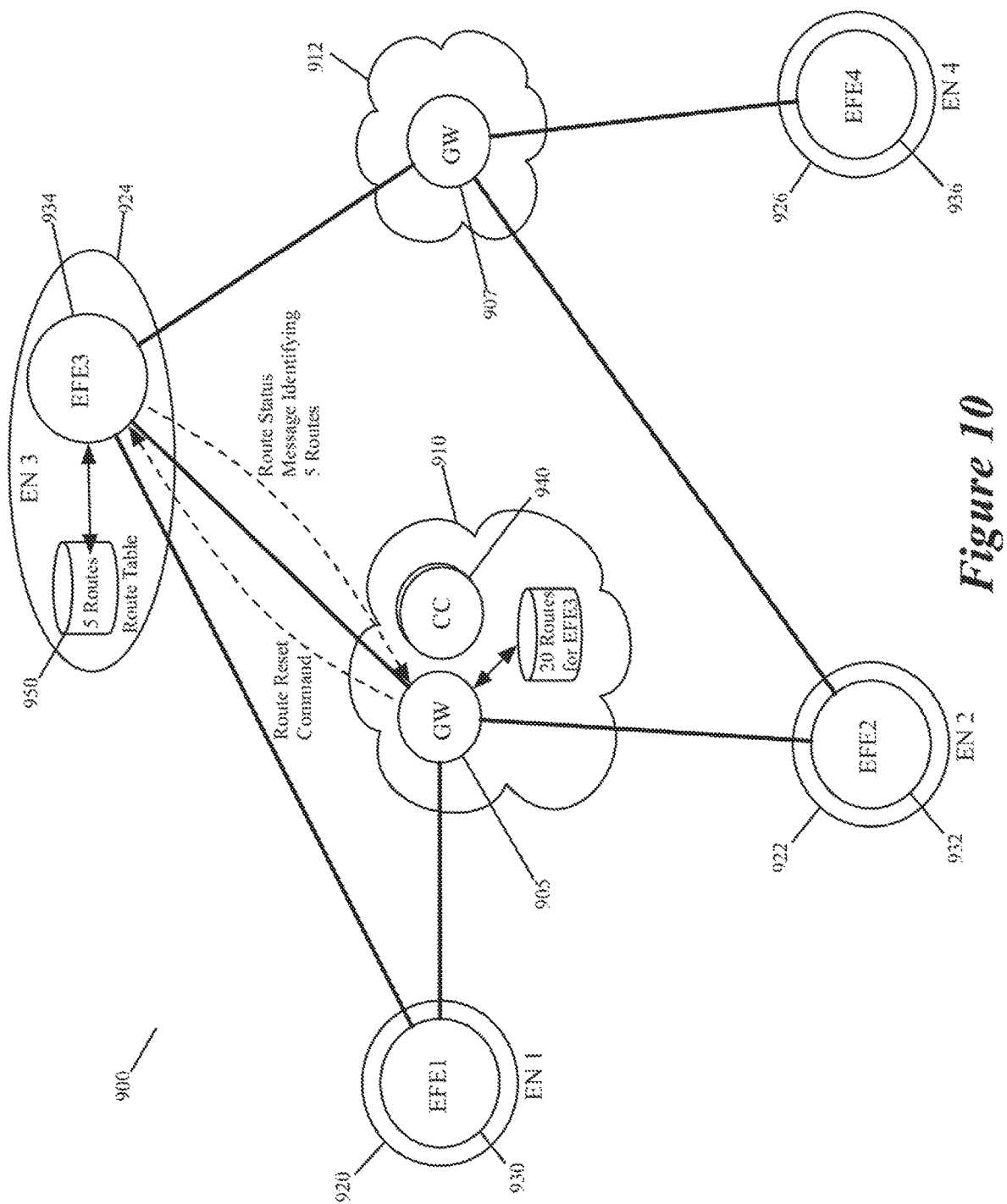
Figure 11:
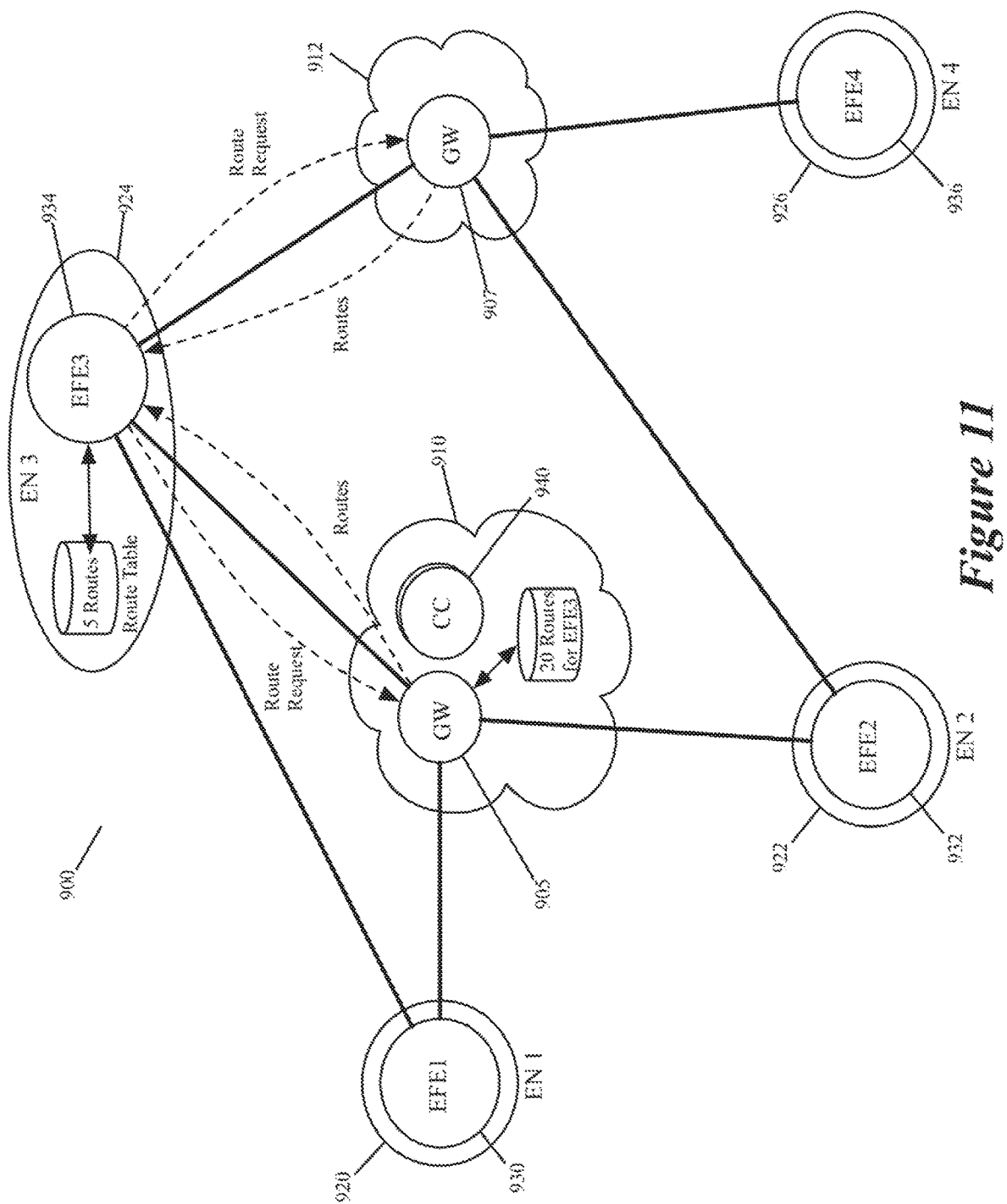
Figure 12:
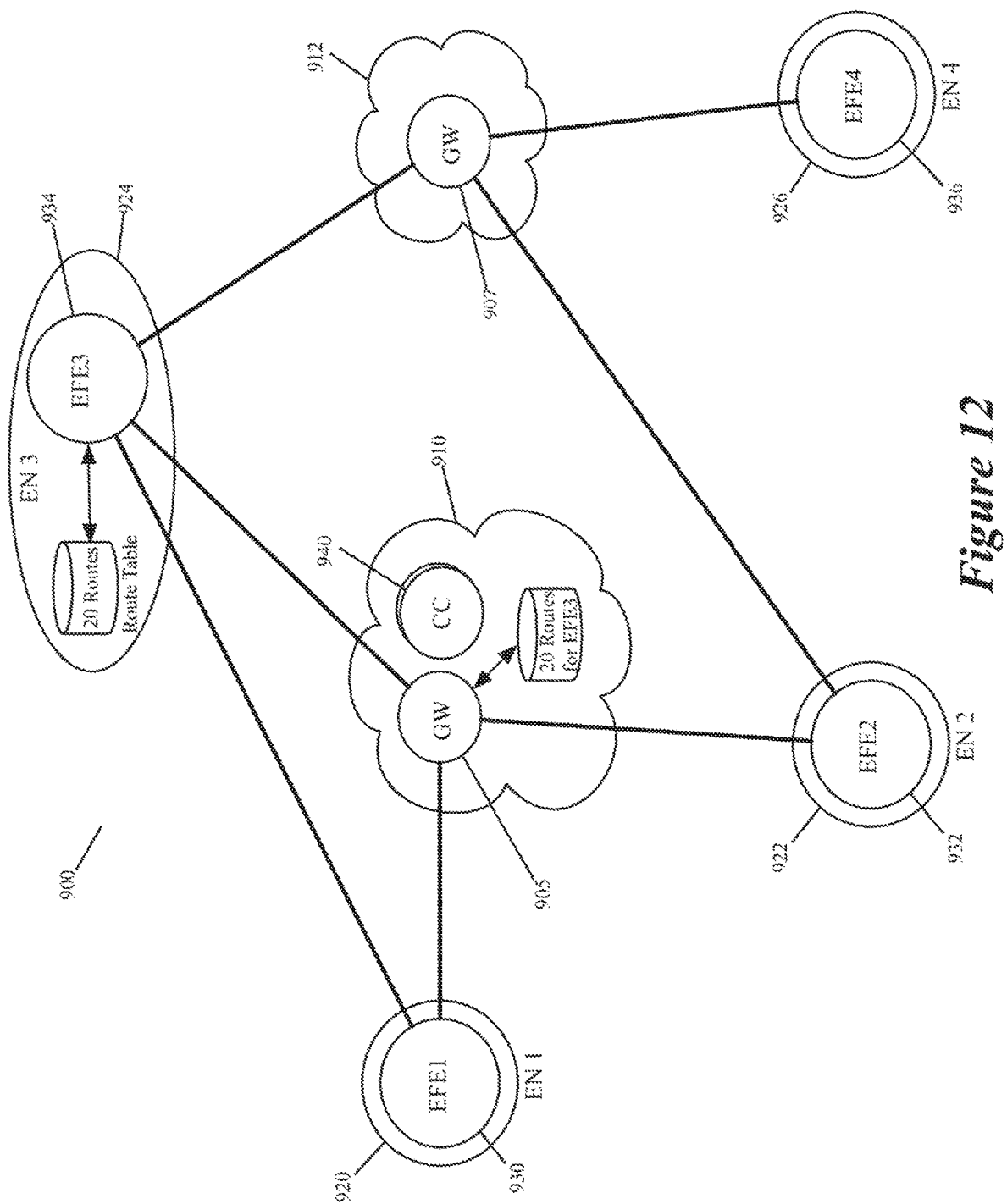

FIG. 10 shows the state of the virtual network 900 a period of time later after the time period shown in FIG. 9. In FIG. 10, the number of routes that the edge forwarding element 934 stores has dropped to 5. The gateway 905 detects this change, and directs the edge forwarding element 934 to reset its set of routes. FIG. 11 then shows the edge forwarding element 934 directing the gateways 905 and 910 to synchronize the routes that they maintain with the edge forwarding element 934. It also shows these gateways using a route sharing protocol (such as BGP, OSPF, or VCRP) to provide the routes that they learned and/or received with the edge forwarding element 934. FIG. 12 shows the routing table 950 of the edge forwarding element 934 as once again storing twenty routes across the virtual network.

In the example illustrated in FIG. 9-12, the edge forwarding element 934 performs the route reset operation by directing all the gateways (including the anomaly-detecting gateway) to which it connects to synchronize the routes that they maintain with the edge forwarding element 934. Conjunctively, or alternatively, the edge forwarding element 934 in other embodiments performs the route reset operation by directing other edge forwarding elements to synchronize the routes that they maintain with the particular edge forwarding element.

Figure 13:
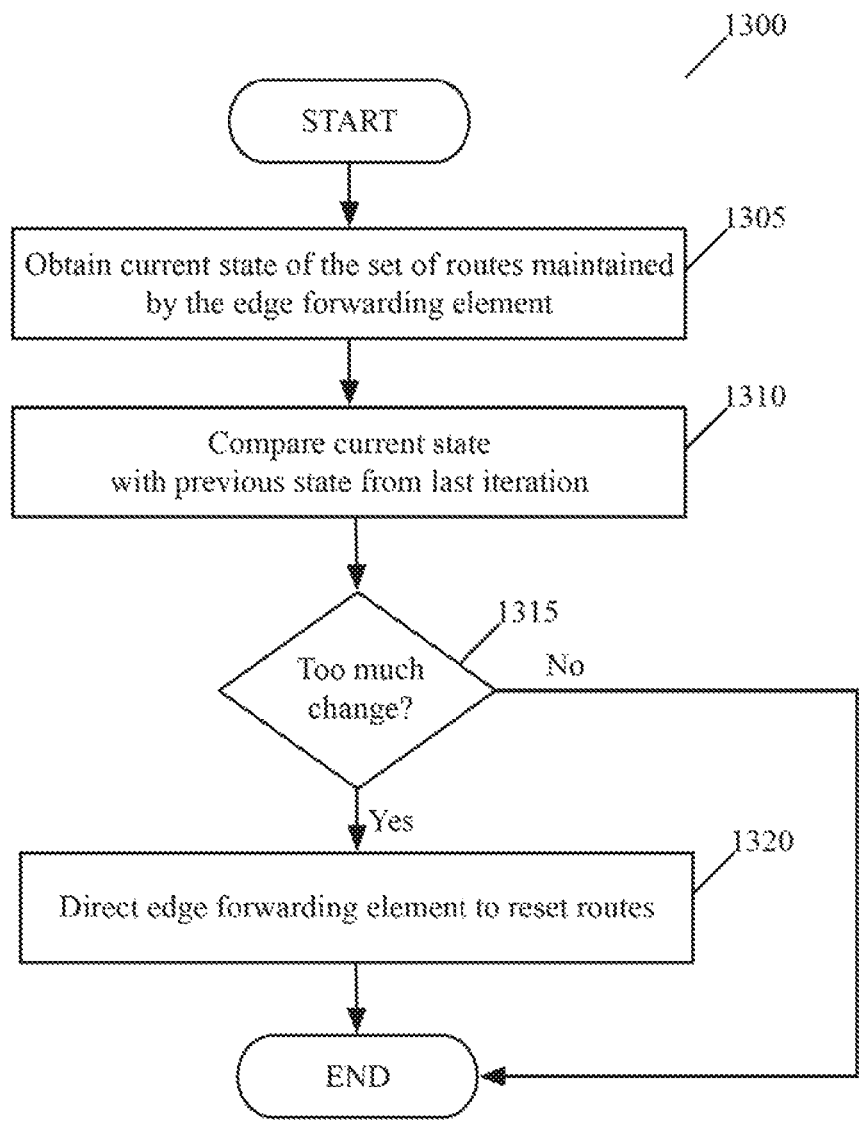
FIG. 13 illustrates a process performed by a gateway to detect an anomaly in the set of routes that is maintained by an edge forwarding element that has an active connection session with the gateway.

FIG. 13 illustrates a process 1300 performed by a gateway to detect an anomaly in the set of routes (across the virtual network) that is maintained by an edge forwarding element that has an active connection session with the gateway. The gateway periodically (e.g., once every 5 minutes, 15 minutes, 30 minutes, etc.) performs this process in order to ensure that the edge forwarding element's maintained set of routes have not been corrupted. In some embodiments, this corruption simply entails an unacceptable reduction in the number of maintained routes, while in other embodiments, it entails an unacceptable amount of changes (e.g., additions, modifications, etc.) to the maintained routes.

As shown, the process 1300 starts by the gateway obtaining (at 1305) data regarding the current state of the edge forwarding element's maintained set of routes. In some embodiments, this data is in the form of the number of routes, while in other embodiments the data includes the actual maintained routes. Next, at 1310, the process 1300 compares the current state of the set of routes maintained by the edge forwarding element with the prior state that the gateway obtained in its prior iteration of the process 1300.

This comparison in some embodiments simply entails comparing the current number of maintained routes with the number of maintained routes that it previously identified for the edge forwarding element. In other embodiments, this comparison involves performing a differential synchronization operation (e.g., using Merkel trees) to identify the differences between the current route list and the prior route list obtained from the edge forwarding element.

At 1315, the process determines whether the comparison operation (at 1310) identified changes between the old and current maintained route list that is beyond an acceptable threshold value of change. When just comparing the number of maintained routes, the determination (at 1315) is whether the number of changed routes exceeds a certain acceptable threshold. When the comparison involves comparing actual routes between the old and new lists, the determination (at 1315) involves a determination as to whether the number of changes in the routes exceeds a certain acceptable threshold.

When the process determines (at 1315) that the changes are not beyond an acceptable threshold, the process ends. Otherwise, when the changes are beyond an acceptable threshold, the gateway directs (at 1320) the edge forwarding element to perform a route reset operation, and then ends. As mentioned above, an edge forwarding element performs a route reset operation in some embodiments by directing the gateways, with which it has active connection sessions, to synchronize the routes that they maintain with the edge forwarding element.

In some embodiments, an edge forwarding element, or another module executing on the same device or another device in the forwarding element's associated edge node, performs the process 1300 to detect an anomaly in its maintained list of routes. To do this, the edge node monitoring agent (i.e., the edge forwarding element or the other module operating in its edge node) maintains one or more sets of prior routes of the edge forwarding element. During each check, the monitoring agent compares the prior route set(s) with the current route set of the edge forwarding element to identify any anomaly between the two sets that is beyond an acceptable threshold. Upon detecting this condition, the monitoring agent in some embodiments directs the edge forwarding element to perform a route reset operation to obtain new routes from the gateways. Conjunctively, or alternative, the monitoring agent in some embodiments generates a report to alert an administrator and makes this report available through email or text, and/or through a user interface of a management tool.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
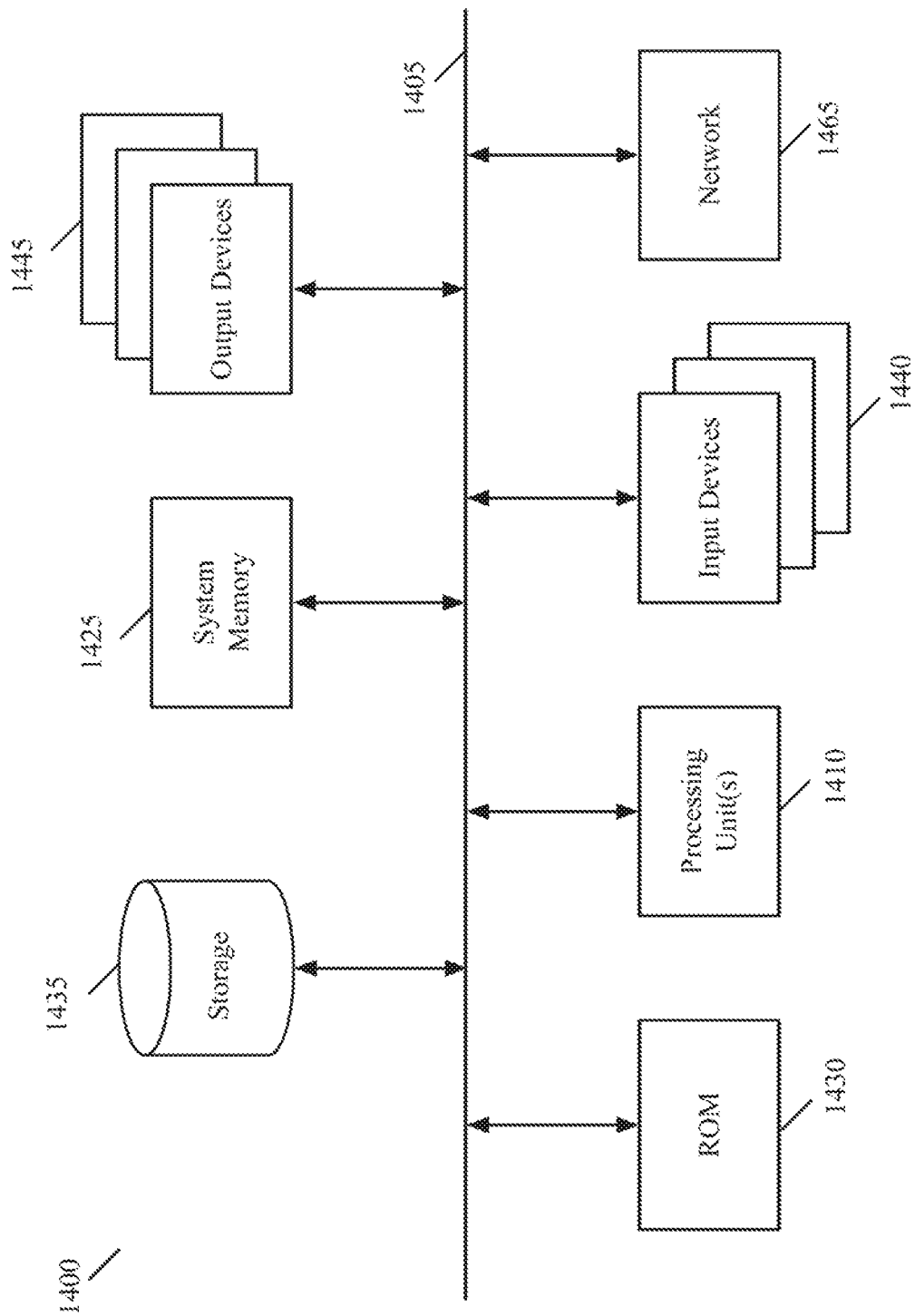
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet), or a network of networks (such as the Internet). Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

What is claimed is:

1. A method of maintaining a virtual wide area network (WAN) that spans at least one cloud datacenter separate from multi-machine edge nodes of an entity, the method comprising:
    at a gateway in the cloud datacenter that is used to establish the virtual WAN with a plurality of edge devices at a plurality of edge nodes:
        establishing secure connections with the plurality of edge devices at the plurality of edge nodes in order to establish the virtual WAN;
        examining route records maintained at a particular edge device for routes across the virtual WAN, in order to detect an anomaly in the route records indicative of the route records being corrupted;
        detecting the anomaly in route records maintained at the particular edge device for routes across the virtual WAN; and
        in response to the detecting, directing the particular edge device to perform a route reset operation to re-identify route records for routes across the virtual WAN.

2. The method of claim 1, wherein detecting the anomaly comprises detecting a drop in a number of route records maintained at the particular edge device that is larger than a threshold value.

3. The method of claim 1, wherein examining the route records comprises:
    at the gateway,
        storing an old list of route records that are maintained at the particular edge node;
        identifying a new list of route records that are maintained at the particular edge node;
        performing a differential synchronization operation that compares the old and new lists to identify changes to the new list; and
        when changes to the new list exceed a threshold value, detecting the anomaly.

4. The method of claim 3, wherein identifying the new list comprises obtaining the new list from the particular edge node.

5. The method of claim 3 further comprising storing the new list as the old list when changes to the new list do not exceed a threshold value.

6. The method of claim 1, wherein the detected anomaly relates to race conditions that incorrectly cause the particular edge node to filter out a subset of the route records.

7. The method of claim 6, wherein another edge node and the particular edge node are configured to establish a tunnel through which the two edge nodes forward data messages and forward routes to use to forward data messages to each other and to one or more gateways.

8. The method of claim 7, wherein the other edge node and the particular edge node are configured in a hub/spoke topology.

9. The method of claim 1, wherein the particular edge device performs the route reset operation by directing at least one other edge device to synchronize the set of route records maintained by the other edge device with the particular edge device.

10. The method of claim 1, wherein the particular edge device performs the route reset operation by directing the gateway to synchronize the set of route records maintained by the gateway with the particular edge device.

11. The method of claim 1, wherein the particular edge device performs the route reset operation by directing at least one other gateway to synchronize the set of route records maintained by the gateway with the particular edge device.

12. The method of claim 1, wherein the route records comprise route records identified by other edge devices.

13. The method of claim 1, wherein the route records comprise route records learned by the gateway.

14. The method of claim 1, wherein the edge nodes comprise at least one of branch offices of an entity and datacenters of the entity.

15. A non-transitory machine readable medium storing a program for execution by at least one processing unit of a device implementing a gateway to maintain a virtual wide area network (WAN) that spans at least one cloud datacenter separate from multi-machine edge nodes of an entity, the program comprising sets of instructions for:
  at the gateway in the cloud datacenter that is used to establish the virtual WAN with a plurality of edge devices at a plurality of edge nodes:
    establishing secure connections with the plurality of edge devices at the plurality of edge nodes in order to establish the virtual WAN;
    detecting an anomaly in route records maintained at a particular edge device for routes across the virtual WAN; and
    in response to the detecting, directing the particular edge device to perform a route reset operation to re-identify route records for routes across the virtual WAN.

16. The non-transitory machine readable medium of claim 15, wherein the set of instructions for detecting the anomaly comprises a set of instructions for detecting a drop in a number of route records maintained at the particular edge device that is larger than a threshold value.

17. The non-transitory machine readable medium of claim 15, wherein the set of instructions for detecting the anomaly comprises sets of instructions for:
  storing an old list of route records that are maintained at the particular edge node;
  identifying a new list of route records that are maintained at the particular edge node;
  performing a differential synchronization operation that compares the old and new lists to identify changes to the new list;
  when changes to the new list exceed a threshold value, specifying that an anomaly has been detected.

18. The non-transitory machine readable medium of claim 17, wherein the set of instructions for identifying the new list comprises a set of instructions for obtaining the new list from the particular edge node.

19. The non-transitory machine readable medium of claim 17, wherein the program further comprises a set of instructions for storing the new list as the old list when changes to the new list do not exceed a threshold value.

20. The non-transitory machine readable medium of claim 15, wherein the detected anomaly relates to race conditions that incorrectly cause the particular edge node to filter out a subset of the route records.

* * * * *